Patented July 8, 1924.

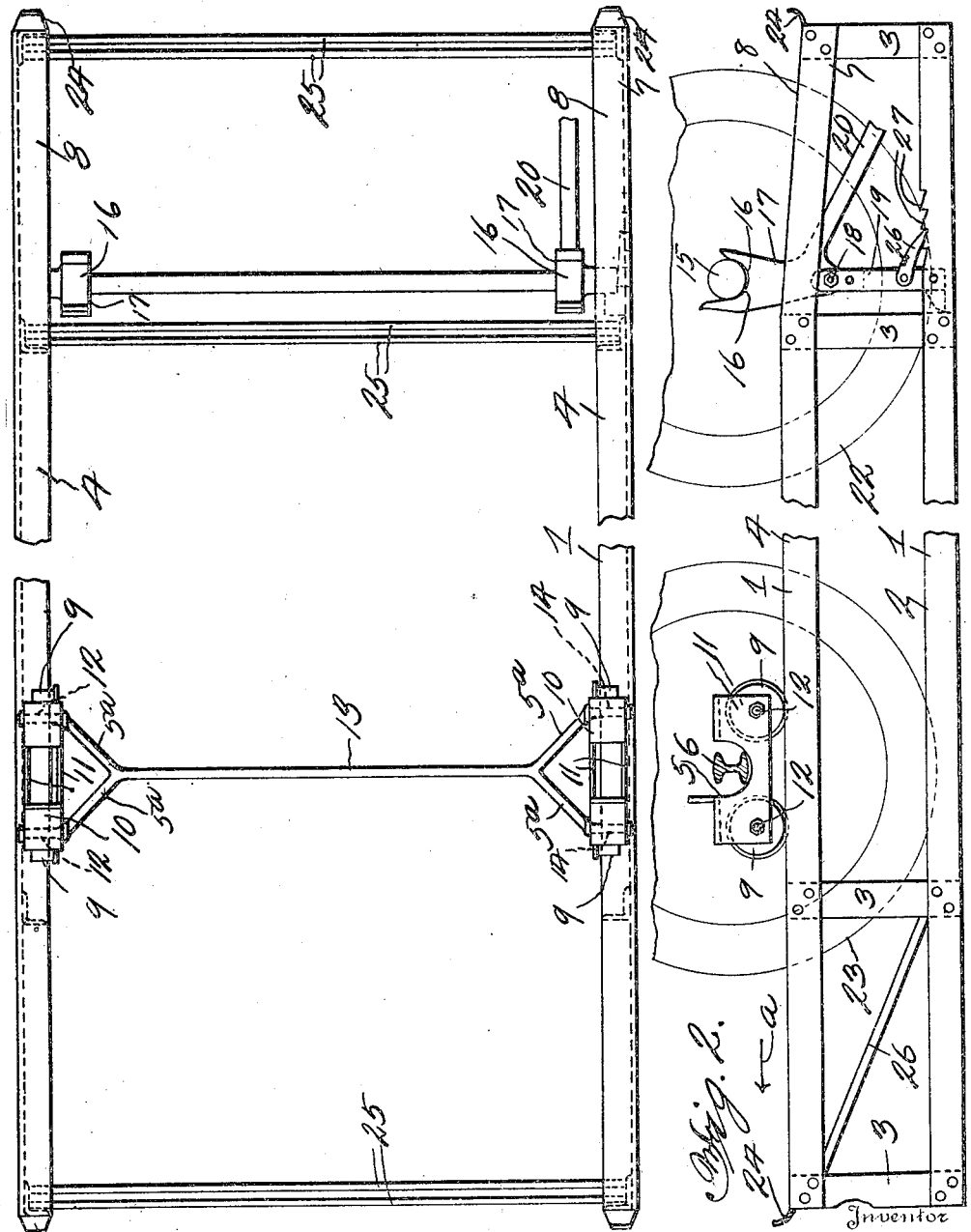

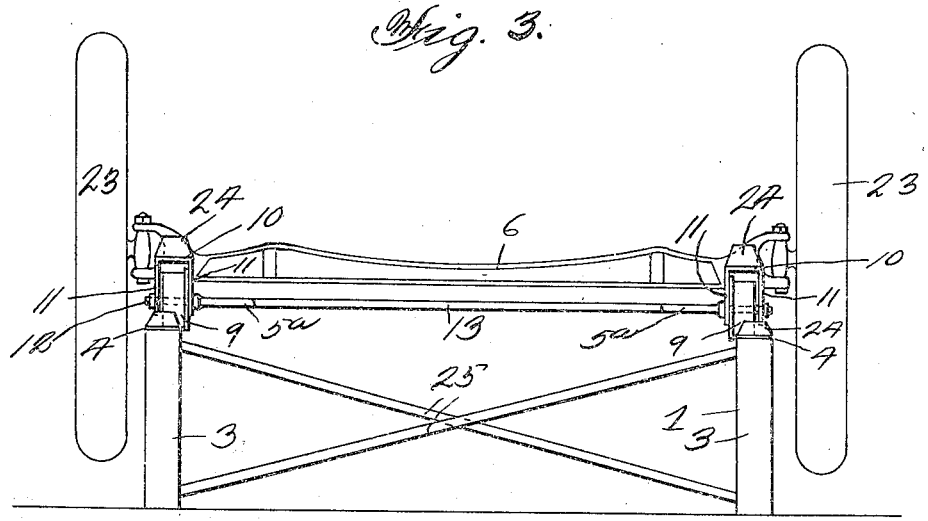
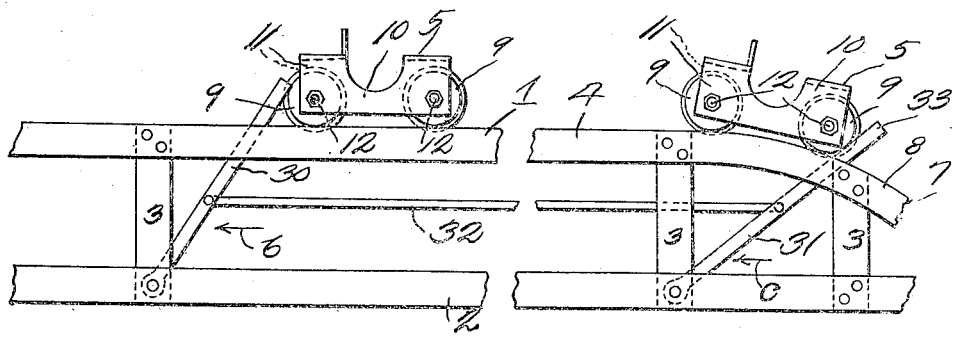
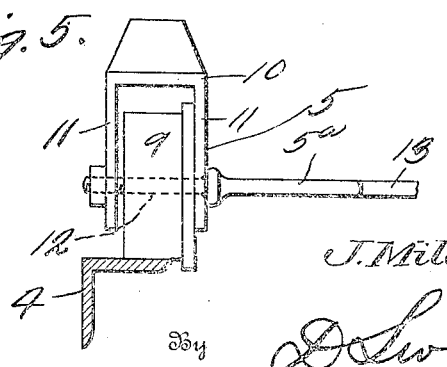

1,500,680

UNITED STATES PATENT OFFICE.

JOSEPH MILLER, OF FOSTORIA, OHIO.

AUTOMOBILE STAND.

Application filed May 10, 1922. Serial No. 559,815.

*To all whom it may concern:*

Be it known that I, JOSEPH MILLER, a citizen of the United States, residing at Fostoria, in the county of Seneca, State of Ohio, have invented a new and useful Automobile Stand; and I do hereby declare the following to be a full, clear, and exact description of the invention, such as will enable others skilled in the art to which it appertains to make and use the same.

The invention relates to automobile stands particularly adapted for supporting an automobile spaced from the ground or floor with its tires out of engagement with the ground or floor, thereby allowing the tires to be deflated for instance when the automobile is in storage and consequently preventing rapid deterioration of the tires.

A further object is to provide an automobile stand comprising spaced rails for the reception of connected carriages which receive the front axle of the vehicle, said stand being provided with a jack cooperating with the rear axle whereby the rear end of the automobile may be raised, for raising the rear tires above the flooring or ground. Also to provide adjacent the ends of the frame upwardly extending stop members for preventing the carriages from coming off the ends of the rails, said rails inclining downwardly adjacent their ends.

A further object is to provide lever means whereby an additional carriage may be moved under the rear axle of the automobile if desired.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the stand.

Figure 2 is a side elevation of the stand.

Figure 3 is a rear view of the stand, showing an automobile axle supported on the carriage thereon.

Figure 4 is a side elevation of a modified form of stand showing lever means for moving a second carriage into position.

Figure 5 is a detail view of one end of the carriage showing the same disposed on one of the rai Referring to the drawing the numeral 1 designates a stand, which stand comprises spaced floor engaging bars 2 having upwardly extending bars 3 on the upper ends of which are secured spaced carriage engaging rails 4, which are in parallel relative to each other and support the carriage 5. The carriage 5 is adapted to receive the forward axle 6 of the automobile when the carriage is disposed adjacent the front end 7 of the stand and on the downwardly and outwardly inclined portion 8 of the rails 4, at which time the carriage may be easily passed under the axle 6 and receive the axle 6 as the carriage is moved up the inclined portions of the rails of the stand. During the continued movement of the automobile over the stand, the axle 6 will cause a movement of the carriage to a position where the axle will engage the carriage and the continued movement of the carriage on the stand will cause the forward end of the automobile to be raised from the ground or floor as the automobile and its front axle are moved towards the rear of the stand. The carriage 5 is supported on flanged wheels 9 which are rotatably mounted in frames 10, said frames being preferably formed from a single piece of metal bent to a U-shaped form and between the flanges 11 of which the flanged wheels 9 are pivotally mounted on the shafts 12 of the connecting brace 13 of the carriage 5. The connecting brace 13 at its ends merge into diverging arms 14 formed integral with the shafts 12, therefore it will be seen that the frames 10 are held rigidly in spaced relation to each other. When an automobile is moved onto the stand the carriage 5 is disposed on the inclined portions 8 of the rails 4 under the axle 6 of the vehicle and is engaged by the axle and moved up the inclined portions of the rails by the axle as the vehicle moves to a position above the stand. As the vehicle is moved in the direction of the arrow *a* the front axle 6 is raised by the carriage going up the inclined portions 8 of the rails 4 until the rear axle 15 is in position where it can be engaged by the axle engaging portion 16 of the jack 17, which jack is pivoted at 18 to a pivoted standard 19. By providing the pivoted standard 19, the standard and jack may be moved to a position where they will not interfere with the axle as the vehicle is moved to a position over the same. When the handle member 20 of the jack is moved downwardly after the jack is raised or extended to operative position, as shown in Figure 2, where its axle engaging end will be disposed above the rails 4 and in engagement with the rear axle 15, it is obvious that the rear axle 15 will be moved upwardly and consequently the rear tires 22 will be raised out of engagement with the flooring, at which time they may be deflated if so desired, for instance when the automobile is in storage. During the movement of the carriage 5, the front tires 3 are raised out of engagement with the floor and consequently the weight of the automobile relieved therefrom and the tires 23 may also be deflated, if so desired. The ends of the rails 4 are provided with upwardly extending stops 24 which engage the wheels 9 of the carriage 5 and prevent the carriage from coming off the rails 4. The stand is transversely braced by connecting bars 25 and by the longitudinally disposed bars 26, however it is to be understood that the bracing of the device may be of any form desired. The standard 19 is held in position during the jacking operation or for holding the vehicle after it has been raised by pivoted dog 26, which dog cooperates with ratchet teeth 27 in one of the floor engaging bars 2, said dogs also allow the standards to assume a position substantially horizontal in relation to the floor when the jack is folded and not in use.

Referring to Figure 4 wherein two carriages 5 are shown, the carriage 5 adjacent the inclined end 7 of the stand is used where it is desired to support the axle in carriages. When this is done, the operator may move the carriage adjacent the end 7 of the stand in which the rear axle is disposed onto the tracks 4 by imparting a pull onto the lever 30 in the direction of the arrow *b* thereby moving the pivoted lever 31 in the direction of the arrow *c* by means of the connecting rod 32. When the above operation takes place the free end 33 of the lever 31 will engage the adjacent carriage 5 and cause the same and the vehicle supported thereon as well as the other carriage 5 to move longitudinally on the rails 4.

From the above it will be seen that an automobile stand is provided which is simple in construction, the parts reduced to a minimum, and one wherein an automobile may be easily and quickly elevated from the ground or floor for relieving the weight from the tires.

The invention having been set forth what is claimed as new and useful is:—

An automobile stand comprising a frame, spaced rails carried by said frame in a horizontal position and in parallel relation, said rails adjacent one end of the frame inclining downwardly and outwardly, wheel supported axle engaging carriages mounted on the rails and adapted to engage the axles of an automobile, a lever pivoted adjacent the inclined ends of the rails and adapted to cooperate with the carriage for engaging the rear axle and moving said carriage longitudinally on the rails, upwardly extending curved members carried by the lower ends of the inclined ends of the rails and adapted to engage the carriages and limit their movement in one direction, and lever means operable from the other end of the frame and cooperating with the first named lever and forming means whereby said first named lever may be moved, said lever means being foldable to a position below the rails and extensible to a position above the rails.

In testimony whereof I have signed my name to this specification in the presence of two subscribing witnesses.

JOSEPH MILLER.

Witnesses:
WILLIAM CLARY,
FRANK HOMAN.